United States Patent Office 3,667,856
Patented June 6, 1972

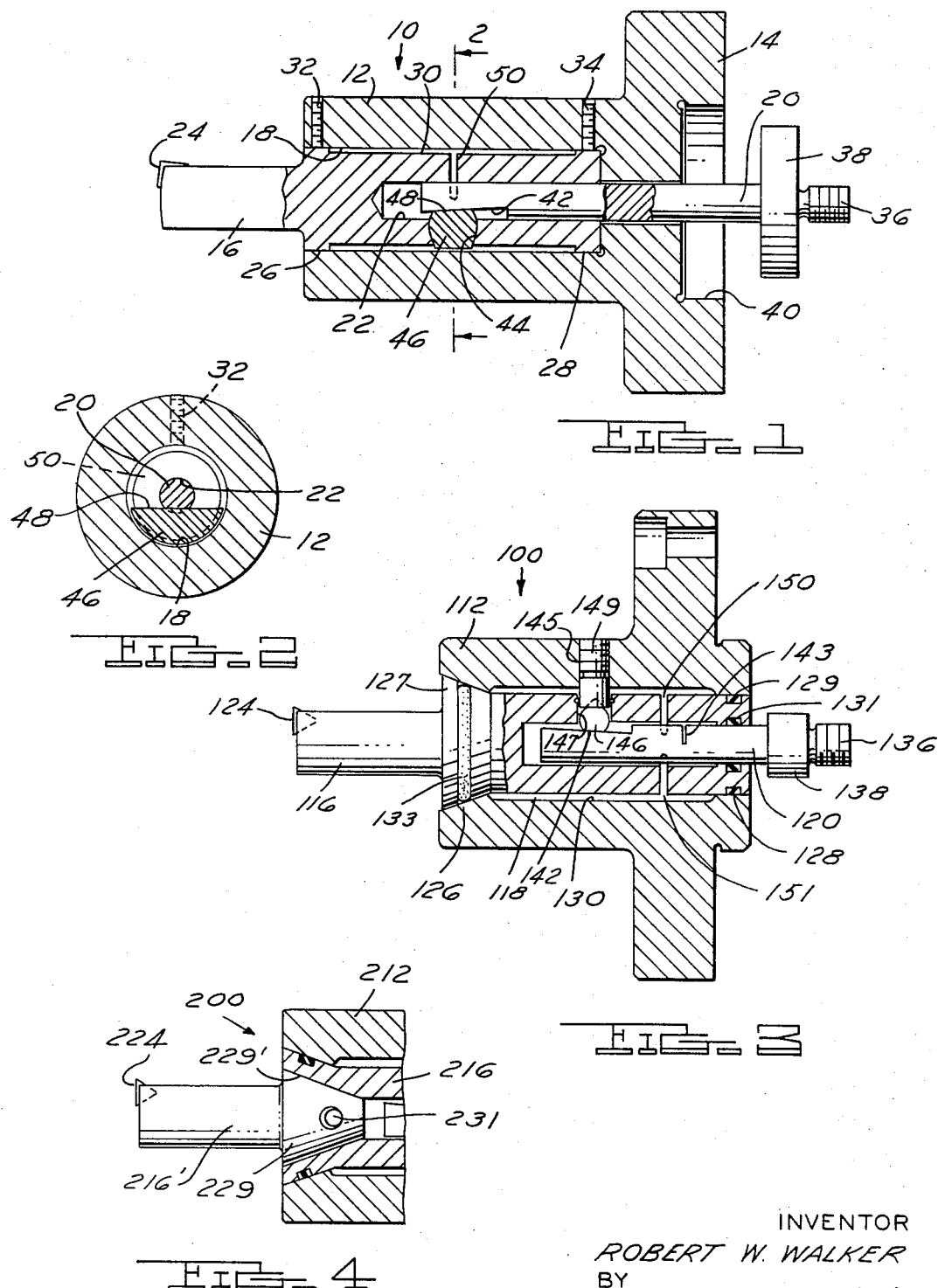

3,667,856
SMALL POINT RETRACTABLE BORING TOOL
Robert W. Walker, Detroit, Mich., assignor to
The Valeron Corporation
Filed May 18, 1970, Ser. No. 38,152
Int. Cl. B23b 29/034
U.S. Cl. 408—158
9 Claims

ABSTRACT OF THE DISCLOSURE

A boring tool with means for adjusting a single point boring bar to change its cutting diameter and which includes a housing support receptive of the tool shank therewithin, spaced bearing supports, and means acting on the bar between the bearing supports to flex the shank and change the relative location of its cutting point, particularly including a linear actuating rod adapted to effect the change through actuation from the supported end of the tool and while it is in service.

BACKGROUND OF THE INVENTION

There are several boring tools which enable the cutting diameter of the tool to be changed, or to be maintained, to compensate for wear, without stopping the tool to make the adjustments. However, none of these are particularly suitable for boring small holes or boring holes relatively close together.

Feed-out heads with cross-slides have been used and can be made to accommodate small bore cutting tools. But, they require a large supporting end to accommodate the cross-slide and consequently preclude close stacking of different tools.

Cartridge-type tools, with cutter cartridges on the periphery of the tool shank, require an actuating member within the tool shank and under the cartridges and are accordingly limited as to how small in diameter they can be made and how small a hole they can be used to make.

Other tools which cause eccentric movement of the cutting point can cause an unbalance or may cause the fundamental geometry to be altered.

SUMMARY OF THE INVENTION

The present invention is directed to a small bore single point cutting tool including means of automatically adjusting or maintaining the cutting diameter of the tool, in a new and novel manner, and wherein the supporting end of the tool is relatively small in diameter to allow close stacking of like tools.

The tool includes a supporting member that receives the shank of a single point boring bar in one end and a linear actuator in its other end. The shank of the bar is provided with longitudinal support, but at spaced locations, so that there is clearance about its mid-section. The linear actuator is received in a bore in the end of the bar and by providing means for controlled wedge interference therewithin, between the supports, the shank is flexed and the cutting tip reacts accordingly to provide the desired adjustment. By increasing or minimizing the extent of wedge interference, controlled adjustments for larger or lesser cutting diameters are readily obtained.

Variations of the basic tool include those in which the wedge interference is obtained by means in the boring bar or which is part of the supporting structure and wherein the supporting structure rather than the bar actually includes the actuating means.

In each instance, the end of the supporting member that receives the boring bar need be no larger in diameter than the minimum accepted in normal practice and may even be smaller where the strength modulus of the supporting member's material permits.

These and other advantages will be more apparent in the detailed description of several embodiments of tools including the present invention, which follows hereinafter.

DESCRIPTION OF THE DRAWINGS

FIG. 1 is a longitudinal cross-sectioned view of a small bore tool including the novel features of the present invention.

FIG. 2 is a cross-sectional view along the line 2—2 of FIG. 1.

FIG. 3 is a longitudinal cross-sectioned view of another embodiment of the present invention.

FIG. 4 is a fragmentary cross-sectional view of an end modification of the embodiment shown in FIG. 3.

DETAILED DESCRIPTION OF THE ILLUSTRATED EMBODIMENT

The small point tool 10, that is shown in FIG. 1, includes a housing part 12 with a flanged end 14 that is used to fasten it to a drive spindle. It has a boring bar shank 16 received and supported in a center hole 18 provided within its extended end, and it has an actuating rod 20 received within its flanged end and that extends into a center bore 22 provided within the boring bar member itself.

The boring bar member 16 has a cutting insert of point 24 mounted on one end by conventional means, not shown in detail, accommodating the use of indexable throwaway cutting inserts.

Behind the cutting point 24, and about the part of the bar received in the housing 12, there are annular bearing surfaces 26 and 28, near opposite ends of the receptive hole 18 in the housing part, to provide centering supports for the boring bar member. This also provides an annular recess 30 about the bar within the housing.

Set screws 32 and 34, or like means, are used to engage and hold the bar 16 in the housing 12 and provide an essentially integral small hole boring tool. However, it will be appreciated that by loosening the set screws and changing bars, with smaller or slightly larger diameter ends, a broad range of tooling is also possible with the same housing part.

The actuating rod 20 includes a threaded end 36, by which it may be connected to a spindle push-pull rod or other operating means (not shown), and it has a stop collar 38 merely intended to limit axial travel when and as desired.

The flanged end 14 of the housing part 12 has a recess 40 in its supported end to receive the stop collar 38 and in the discussion that follows it will be appreciated that the extent of axial movement to accomplish the cutting point adjustments desired is so small that the movement could be generally accommodiated within this relatively small space.

An inclined ramp 42 is provided on the end of the actuating rod 20. It serves as part of the wedging means that changes the cutting diameter of the bar, when the rod is moved axially. The angular inclination of the interference surface determines the extent of change for each increment of axial movement.

A cross slot 44, in the tool shank 16, between the bearing supports 26 and 28, is provided to receive a wedging member or key 46. Both the slot and the wedge are formed with side walls that converge together radially outwardly so that efforts made to force the wedge out will cause a spreading of the slot walls and flexing of the bar. This, in turn, causes a radial displacement at the cutting end of the tool and a change in the cutting diameter for the tool.

The wedging member 46 is formed to include surface 48 that matches the ramp angle 42 on the actuating rod and it is no wider than the bar so that there is no side wall interference in the housing bore 18.

A cross-cut 50, shown immediately over the wedge slot 44, serves to relieve the bar at the point of maximum compressive loading and consequently enables the bar to be flexed with less force than would otherwise be necessary. By drawing the rod 20 to the right (referring to FIG. 1) the wedge 46 is forced radially outward and the bar 16 is flexed sufficiently to cause a greated cutting diameter. When the rod is moved axially in the opposite direction the wedging pressure is relieved and the elasticity of the bar material will cause a return to its pre-flexed state. This, in turn, will return the cutting point to its original setting.

With an initial flexing to obtain a slightly greater cutting diameter than the tool 10 would have in a normal condition, the flexing pressure can be increased to obtain greater cutting diameters, or relieved for retract purposes, when and as desired, without stopping the tool.

FIG. 3 shows a modified tool 100, with a like adjustment feature. The holder 112 has a through center hole 118 with a bearing support 126 near its front end and a like support 128 near its back end. The supports for the boring bar are provided within the housing, rather than on the bar itself and an annular space 130, for the flexing, is provided between them.

The boring bar 116 includes a conical form 127 which mates with a like conical recess provided within the bearing support 126, to help center the front end of the tool shank in the housing part. Other refinements include wear rings 129 and 131 provided at the inner end of the bar and a sealing ring 133 within the conical area.

The actuating rod 120 includes a threaded end 136 with a slightly different stop collar 138, essentially the same inclined plane or ramp surface 142, and, in this instance, a relief cut 143 of its own just behind the wedging end of the rod.

A radial hole 145 through the supporting end of the holder 112 extends inward and is aligned with a like hole 147 in the tool shank. The holder hole is threaded and has an adjustment screw 149 in it which extends down into the hole in the tool shank and retains a flatted ball 146 in engagement with the ramp or wedging cam end 142 of the actuating rod 120.

The boring bar 116 has cross cuts 150 and 151 behind the wedge means to facilitate the flexing desired and the tool operates essentially the same, by linear movement of the rod to effect a change in the cutting diameter of the cutting point.

FIG. 4 shows a tool 200 wherein the boring bar includes a cylindrical shank part 216 received in the housing part 212 and a nose section 216' that includes the cutting point 224. It has a conical end 229 that fits within a conical recess 229' in the cylindrical shank part and a cross-screw 231 with a locking throw to keep the nose section engaged to the shank part so that the tool is, for all practical purposes, the same as that of FIG. 3, except that different noses may be used with the same supporting shank section.

The adjustment screw 149 in the tool 100, shown in FIG. 3, may be employed as a simple alternative mechanical means for flexing the tool shank, independent of the linear actuation of the rod 120. That is, the screw itself can cause the flexing by being turned down against a wedge or it can act directly against a shank section between the two supports, itself, to cause the flexing of a bar.

Unlike other retract or adjustable boring tools, none of the operating mechanism is required to be in the cutting end of the tool, under the cutting point, and consequently small bore holes can be accommodated. At the same time, the tool is relatively small at its supported end, so that multiple tools can be located close together. No cross-slides or other space consuming operating mechanism is required, only a simple push-pull linear actuator or other means to flex the bar between its internal supports, as has been shown and described.

I claim:
1. A cutting tool, comprising;
   a holder,
   a boring bar having a cutting point provided at one end,
   means for receiving and supporting the other end of the bar at axially spaced locations within said holder,
   and interference wedging means within the holder and operatively disposed relative to the bar between the said supporting means and providing radial displacement of said cutting point upon linear actuation thereof,
2. The cutting tool of claim 1,
   said bar being relieved partially therethrough, between said supporting means, for more readily permitting the flexing thereof.
3. The cutting tool of claim 2,
   said wedging means being provided at least in part within the partial relief last mentioned.
4. The cutting tool of claim 1, including,
   a bore hole within the other end of said bar and a linear actuator received in said bore hole from the supported end of said holder,
   and said linear actuator being provided with an inclined plane surface that provides part of said interference wedging means.
5. The cutting tool of claim 4,
   said bar having a cross-cut through one side thereof, and between said supporting means, of narrowing dimensions radially outward,
   a wedging member received within said cross-cut and having an actuating surface exposed within said bore hole,
   and the inclined plane surface of said linear actuator being disposed in engagement with said actuating surface.
6. The cutting tool of claim 4,
   said holder and bar having aligned holes radially therethrough and opening into said bore hole,
   and a member in said aligned holes for pre-set interference wedging engagement with said linear actuator.
7. The cutting tool of claim 6,
   said interference member being adjustable for varying the extent of interference engagement with said linear actuator.
8. The cutting tool of claim 7,
   said interference member including a flatted ball and said actuator being sufficiently flexible laterally to adapt to flexing movement of said bar.
9. The cutting tool of claim 1,
   said bar including separable nose ends with replaceable cutting points having conical seating engagement with the bar stock end thereof.

References Cited
UNITED STATES PATENTS

| | | | |
|---|---|---|---|
| 2,179,573 | 11/1939 | Criddle | 408—158 |
| 2,412,038 | 12/1946 | Freisen | 408—156 |
| 3,007,356 | 11/1961 | Jones | 408—147 |
| 1,794,080 | 2/1931 | Longley | 408—168 |
| 2,441,158 | 5/1948 | Krasnow | 408—147 |

GERALD A. DOST, Primary Examiner

U.S. Cl. X.R.

408—146